(12) United States Patent
Schnellbach et al.

(10) Patent No.: US 10,974,174 B2
(45) Date of Patent: Apr. 13, 2021

(54) SEPARATION DEVICE FOR SEPARATING A SOLID MATERIAL FROM A CONVEYING STREAM AND METHOD FOR MAINTAINING SUCH A SEPARATION DEVICE

(71) Applicant: NORDSON CORPORATION, Westlake, OH (US)

(72) Inventors: Nikolai Schnellbach, Senden (DE); Bernd Bakenecker, Dülmen (DE); Marius Wirz, Emsdetteb (DE); Michael Schröer, Ludwigshafen (DE)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 16/368,580

(22) Filed: Mar. 28, 2019

(65) Prior Publication Data

US 2019/0299127 A1    Oct. 3, 2019

(30) Foreign Application Priority Data

Mar. 28, 2018    (EP) ..................... 18164747

(51) Int. Cl.

| | |
|---|---|
| *B01D 21/00* | (2006.01) |
| *B01D 21/24* | (2006.01) |
| *B01D 21/26* | (2006.01) |
| *F26B 17/22* | (2006.01) |
| *F26B 15/08* | (2006.01) |
| *B01D 21/02* | (2006.01) |

(52) U.S. Cl.
CPC ......... *B01D 21/0006* (2013.01); *B01D 21/02* (2013.01); *B01D 21/245* (2013.01); *B01D 21/26* (2013.01); *F26B 15/08* (2013.01); *F26B 17/22* (2013.01); *F26B 2200/08* (2013.01)

(58) Field of Classification Search
CPC .......... F26B 17/22; F26B 17/30; F26B 17/34; F26B 25/08; F26B 25/12; F26B 3/24; F26B 5/12; B04B 5/12; B01D 21/0006; B01D 21/02
USPC ............ 34/59, 183, 166, 173, 147; 210/374; 366/85; 209/301

See application file for complete search history.

(56) References Cited

U.S. PATENT DOCUMENTS 5,265,347 A * 11/1993 Woodson ................ F26B 17/30
                                                            34/182
5,638,606 A *  6/1997 Bryan ....................... F26B 5/08
                                                            34/147

(Continued)

FOREIGN PATENT DOCUMENTS

| DE | 1251241 B | 9/1967 |
|---|---|---|
| DE | 102004052055 A1 | 4/2006 |
| DE | 202007004462 U1 | 7/2008 |

*Primary Examiner* — Claire A Norris
(74) *Attorney, Agent, or Firm* — BakerHostetler

(57) ABSTRACT

A separation device, such as a centrifugal dryer, for separating a mixture of a solid material and a fluid is described. The device has a housing having at least one housing inlet for supplying the mixture and at least one housing outlet for discharging the solid material or the fluid separated from the mixture. The device also has a rotor that is arranged within the housing and is mounted rotatably around a longitudinal axis. The rotor causes movement of the solid material in the direction of the longitudinal axis by rotating. The rotor has multiple rotor segments, which can be separated from each other.

20 Claims, 8 Drawing Sheets

(56) References Cited

U.S. PATENT DOCUMENTS

| | | | |
|---|---|---|---|
| 6,807,748 B2* | 10/2004 | Bryan | F26B 5/08 34/108 |
| 2009/0040863 A1 | 2/2009 | Blach | |
| 2010/0037477 A1 | 2/2010 | Veltel et al. | |
| 2010/0050458 A1 | 3/2010 | Aaron et al. | |
| 2017/0254164 A1 | 9/2017 | Folk et al. | |

* cited by examiner

SEPARATION DEVICE FOR SEPARATING A SOLID MATERIAL FROM A CONVEYING STREAM AND METHOD FOR MAINTAINING SUCH A SEPARATION DEVICE

CROSS-REFERENCE TO RELATED APPLICATIONS

This application claims priority to European Patent Application No. 18164747.0, filed Mar. 28, 2018, the disclosure of which is incorporated by reference in its entirety.

FIELD OF THE INVENTION

The invention relates to a separation device, in particular a centrifugal dryer, for separating a mixture of a solid material and a fluid, in particular a granulate from water, having a housing which has at least one housing inlet for supplying the mixture and at least one housing outlet for discharging solid material or the fluid separated from the mixture, and a rotor that is arranged within the housing and is mounted rotatably around a longitudinal axis, which is preferably essentially vertical during operation, which rotor is configured to effect a transport movement of the solid material in the direction of the longitudinal axis of the rotor by means of rotation. The invention also relates to a method for maintaining a separation device for separating a granulate from a liquid conveying stream.

BACKGROUND

In the prior art, such separation devices were used to separate a mixture of, for example, a solid and a fluid, in particular a granulate from water. In this case, the mixture of solid and liquid is supplied to the separation device as a conveying stream. Such separation devices are also known as centrifugal dryers and are used, for example, in the plastics processing industry. Such devices are used to separate a previously produced plastic granulate, which is discharged from a granulating device by means of a fluid stream, from the fluid stream again. The separated granulate can then be supplied to further processing or packaging, for example.

The known separation devices for separating granulate, for example, from a water stream have a housing into which, through a housing inlet, the conveying stream consisting of the water stream and the granulate is introduced into the interior of the housing. The housing comprises at least one housing outlet for discharging the solid and/or the fluid. Within the housing, a rotor is rotatably mounted; during operation, this rotor rotates around a longitudinal axis that is arranged to be essentially vertical. In particular, the rotor is configured to by its rotary motion transport the solid essentially along the longitudinal axis of the rotor. The rotor is at least partially surrounded by a sieve. The sieve extends, at least in certain areas, around the rotor in a circumferential direction and also in an axial direction, thus in the direction of the longitudinal axis of the rotor. The sieve is designed in such a manner that it retains the granulate as a solid or a solid material within the effective range of the rotor and allows the liquid phase to pass in a radial direction through the sieve to the outside. This causes the conveying stream to be separated into its solid and liquid components.

Due to contact with the granulate to be conveyed in particular in the longitudinal direction of the rotor, the rotor is subject to constant wear so that the rotor has to be maintained at certain intervals and replaced if necessary.

In certain applications of such separation devices, the rotor may have dimensions of more than 2-3 m in its longitudinal direction. The rotor, which is typically vertically aligned, is changed with the assistance of lifting gear, wherein the rotor is usually lifted out of the separation device at its upper end. However, this is only possible if there is a sufficient ceiling height at the installation site of the separation device. In the most unfavorable case, the separation device must be removed from a granulate production line and the entire separation device must be moved from its vertical alignment to its horizontal alignment in order to be able to replace the rotor. Accordingly, such a change is associated with a high expense.

SUMMARY OF THE INVENTION

The invention was therefore based on the object of improving a separation device for separating a solid material from a conveying stream and a method for maintaining a separation device of the type described above in such a manner that maintenance can be carried out easily and with a shorter expenditure of time.

The invention achieves its underlying object with a separation device for separating a solid material from a conveying stream having the features of the subject matter of claim 1 and with a method for maintaining such a separation device having the features of the subject matter of claim 15. In particular, the invention proposes a separation device whose rotor has multiple separable rotor segments in the direction of the longitudinal axis.

Due to the longitudinally divisible rotor, the invention achieves that the rotor can be removed from the housing in parts and mounted in parts. Such a rotor split in the longitudinal direction can then be lifted out section by section via the upper end of the separation device, if not otherwise possible. Thus, in an advantageous manner, the removal of the separation device from the system and the moving of the separation device are avoided.

In a preferred embodiment of the invention, the separation device is configured to be able to remove the rotor segments of the rotor split, and insert them again, in the longitudinal direction via a side part of the housing, such as an openable and closeable housing door. Lifting out a rotor segment, also referred to as a section of the rotor, via the upper end of the separation device according to the invention is thus avoided. According to a preferred design of the present invention, the rotor is formed by three or more rotor segments, which further improves the handling of the rotor segments, for example when changing the rotor. In the present invention, the term "essentially vertical alignment of the rotor longitudinal axis" is preferably understood as an alignment at an angle of up to 10° inclined to the vertical so that the transport elements implement a transport movement in an almost vertical direction, which simplifies the separation of the solid material from the fluid. In an embodiment of the invention, the longitudinal axis of the rotor and thus the device according to the invention may be inclined to the vertical as a whole, for example at an angle of up to about 40° to the vertical.

In accordance with a preferred development of the separation device according to the invention, two adjacent rotor segments are reversibly detachably connected to each other by means of corresponding connecting parts. The connecting parts form a type of connecting device for the rotor segments of the multi-part rotor, which are preferably arranged coaxially to each other. In particular, the connecting device produces a rotationally fixed connection of the rotor segments around their longitudinal axis and a fixed connection of the rotor segments to each other in the axial direction of the rotor. The connection fixed in the axial direction and the rotationally fixed connection are ensured, for example, by multiple screw connections locking the connecting parts of the connecting device.

Preferably, the connecting parts of the rotor segments have contact surfaces that can be brought into contact with each other, and centering means are furthermore provided for the coaxial and/or radial alignment of the rotor segments relative to each other, which centering means are preferably formed on the contact surfaces. With the assistance of the centering means, the rotor segments are preferably aligned coaxially. In particular, a radial offset of two rotor segments in relation to the longitudinal axis of the rotor is avoided, whereby any imbalances are kept to a minimum during the operation of the separation device according to the invention. Preferably, the contact surfaces of the connecting parts have surface areas which project or recede in the axial direction, engage in an axial manner with each other and effect a corresponding locking in the radial direction. Preferably, the contact surface of one connecting part has a cylindrical projection and the contact surface of the other connecting part has a corresponding cylindrical recess or depression. The corresponding centering means preferably have a backlash-free connection.

Another development of the separation device according to the invention provides that the connecting parts have mutually corresponding force closure elements and/or form closure elements for a given angular alignment of the rotor segments around their longitudinal axis. The rotor segments of the rotor are preferably already brought into a fixed angular alignment with each other during assembly with the assistance of the form closure elements. This means that time-consuming alignment of the rotor segments in the circumferential direction during their replacement is not necessary. This preferably avoids a possible source of error during the maintenance of the separation device according to the invention. With the assistance of force closure elements, the rotor segments are preferably directly coupled with or fixed to each other, wherein a frictional connection in particular acts between the connecting parts as a result of the fixed connection of the rotor segments to each other. The form closure elements are preferably designed as journal-like projections projecting in an axial direction from the contact surface of a rotor segment. The projections preferably engage without any backlash in corresponding recesses in the contact surface of the adjacent rotor segment. Preferably, at least two form closure elements are arranged at a given distance from the longitudinal axis of the rotor segment. In one embodiment of the invention, the form closure elements are arranged in a manner distributed asymmetrically to each other around the longitudinal axis, whereby a preferred alignment of the rotor segments relative to each other is achieved.

The rotor preferably has a lower axial and/or radial bearing for rotatable mounting, which bearing is preferably fastened to a bearing plate arranged on a lower section of the housing. This means that the rotor, which is preferably vertically aligned during operation, is fixed within the housing of the separation device in the axial direction. The lower axial and/or radial bearing is preferably detachably attached to the bearing plate so that, in the event of the maintenance or dismantling of the rotor, the lower bearing can be detached from the bearing plate and the rotor can be set down on the bearing plate at the bottom. The bearing plate preferably forms the base of a separation chamber for the mixture to be separated, which separation chamber is arranged in the housing of the device.

In addition, the rotor has a separate shaft section, which is preferably fixed within the housing by means of the lower axial and/or radial bearing and, in certain areas, extends into the lower rotor segment of the rotor. By means of the separate shaft section, a lower bearing point is formed within the housing of the separation device, on which bearing point the rotor designed according to the invention is mounted. Due to the shaft section extending into the lower rotor segment, a low height within the separation device is also achieved.

According to a preferred development, at least one of the rotor segments, in particular the lower rotor segment, is coupled by means of a shaft coupling with the separate shaft section in order to couple with a drive for rotating the rotor, wherein the shaft coupling is preferably arranged at least in certain sections within the lower rotor segment. The shaft section extending from below into the lower rotor segment is preferably coupled with the shaft section of the lower rotor segment via a connecting coupling. Preferably, a rotationally fixed coupling between the separate shaft section and the shaft section of the lower rotor segment is respectively effected via a feather key connection. In addition, a clamping force is exerted on the respective outer surfaces of the shaft sections via a bush body of the connecting coupling.

A development of the separation device provides that at least one rotor segment, preferably all rotor segments, each have a central shaft section on which at least two rotor stars are arranged for holding multiple transport elements for transporting the solid material in the direction of the longitudinal axis of the rotor. By means of the transport elements arranged on the rotor stars, an external conveyor section is preferably formed on the rotor. In addition, each rotor segment with its shaft section and the rotor star preferably arranged thereon has a correspondingly high level of strength, which improves the ability to maintain the specified shape even at relatively high speeds. With the assistance of the rotor stars, especially the rows of transport elements around the shaft section of the rotor segment or the shaft of the rotor that is then assembled are held in position. At predetermined distances along the shaft of the entire rotor, the rotor star forms a support for the rows of transport elements, which are preferably arranged in a manner distributed around the circumference.

Preferably, each rotor segment has two connecting parts arranged at a distance from each other in the direction of the longitudinal axis of the rotor segment, wherein one connecting part is designed to be essentially plate-shaped and/or is preferably designed as a rotor star with projections projecting outward in the form of stars. Thus, the connecting parts, with their radially outward directed projections, have the object of, in addition to establishing the connection between two rotor segments, positioning the transport elements around the longitudinal axis of the rotor. In order to minimize weight, the plate-shaped connecting parts preferably have openings extending in the axial direction. The connecting parts are preferably connected to each other in a force-fitting and/or positive-locking manner via multiple screw connections extending in the axial direction. The connecting parts designed as rotor stars have a corresponding number of radially outward directed projections corresponding to the number of rows of transport elements provided on the rotor. For example, the transport elements are connected to an end area of a respective projection of the connecting part via connecting plates that extend essentially in parallel to the shaft of the rotor.

In one embodiment of the invention, the rotationally fixed connection of the rotor segments to each other is effected exclusively by the connecting devices, in particular the rotor stars arranged on the shaft sections. In another embodiment of the invention, the shaft sections of the rotor segments are optionally coupled with each other in a rotationally fixed manner by means of shaft couplings, for example.

In another embodiment of the invention, a row of transport elements is respectively arranged on one of the lateral flanks of each radially projecting projection. A projection extending radially outward on the rotor star has, in particular, flanks tapered to be wedge-shaped, wherein, in relation to the direction of rotation of the rotor, the connecting plates with the transport elements arranged thereon are arranged in each case on the flanks pointing in the direction of rotation. Preferably, the transport elements have a decreasing width in the circumferential direction of the rotor in relation to the direction of movement of the solid moved by the transport elements. The front edge in the direction of rotation of the transport element is approximately twice as wide as the rear edge.

According to one development, the rotor segments with their transport elements are at least partially arranged within a sieve surrounding the rotor and/or the rotor segments have a large number of preferably lamella-like transport elements, which are preferably arranged in multiple rows around the longitudinal axis and/or are aligned at an angle inclined to the longitudinal axis of the rotor. With the transport elements, the solid, which is preferably introduced with the conveying stream into a separation chamber at a circumferential surface of the separation chamber, is moved vertically upward from below. In the upper area, the solid, which is almost free of the liquid, is then discharged from the separation chamber via an outlet and from the separation device via a housing outlet for subsequent further processing. The liquid with which the solid is transported is pressed radially outward by the centrifugal forces acting in the radial direction through a sieve arranged around the rotating rotor and then moves in the direction of the lower end of the separation device due to the action of the force of gravity. Four, five, six or more rows of transport elements are preferably provided on the rotor and distributed evenly over the circumference of the rotor. Each row of transport elements on the multi-part rotor can, depending on the size of the rotor, have a number of a few transport elements, such as five or six transport elements, up to a number of more than 20, 30 or 40 transport elements. Each transport element has a surface element that extends approximately radially outward and is preferably inclined at an angle in the range between 20° and 70° to the longitudinal axis of the rotor. The transport element is designed to be similar to a paddle. The outer circumferential surface of the transport element has a curved contour, wherein the transport elements of all rows on the rotor have outer contours that produce an essentially cylindrical shape of the rotor.

In another embodiment of the invention, the rotor is mounted by means of an upper pivot bearing on a bracket at the upper end area of the housing, wherein the upper rotor segment preferably has a shaft section projecting at the upper end, which is accommodated by means of the pivot bearing. The upper rotor segment of an especially vertically aligned rotor has a shaft section projecting beyond the upper end of the rotor, which shaft section is accommodated by means of the pivot bearing in particular at a bracket at the upper end area of the housing. With the assistance of the upper pivot bearing, which is designed, for example, as a radial bearing, the forces transverse to the longitudinal axis of the rotor are in particular absorbed and the rotor is preferably held in its vertical direction. In a preferred development, the pivot bearing at the upper end is configured to absorb forces in the axial direction as well. The bracket to which the pivot bearing is attached extends through the housing of the separation device around an area of the longitudinal axis of the rotor. The bracket is designed to be similar to a support arm, to which the upper pivot bearing is in particular bolted.

In a preferred embodiment of the invention, the bracket has a recess for laterally removing the shaft section of the upper rotor segment. The bracket is arranged or designed within the housing in such a manner that the bracket, which is preferably designed as a support arm, encompasses areas of the shaft section of the rotor. This enables easy removal of the upper rotor segment, in particular after releasing the connection between the upper pivot bearing on the rotor. In a preferred embodiment, the upper rotor segment is primarily moved upward in the axial direction and is suspended in a receptacle provided in the housing for this purpose so that a middle rotor segment or a rotor segment arranged below the upper rotor segment can be removed from the interior of the housing of the separation device. In particular, the replacement of rotor segments that are defective or have reached their wear limit is thus simplified since all rotor segments do not necessarily have to be removed from the housing in order to be able to remove only the lower rotor segment from the interior of the housing.

The rotor is enclosed in a separation chamber that surrounds the rotor circumferentially and that is defined at least by the sieve, and the housing has at least one lateral opening and a flap for closing the opening, which are designed in such a manner that one rotor segment or all rotor segments is/are introduced into the housing through the opening and can be removed from the housing through the opening. The sieve which is arranged around the rotor and which defines the separation chamber around the rotor has a small distance to each lifting element so that contact with the sieve is avoided. The distance amounts to approximately 5 mm to about 15 mm and is preferably larger than the grain diameter of the granulate, in order to avoid jamming of the solid between the transport elements and the sieve and a "grinding effect" on the components. The transport movement of the solid material by means of the rotating rotor, which movement takes place essentially along the longitudinal axis, means a movement of the solid with an axial component from one end of the rotor in the direction of the other end of the rotor, even if the solid actually performs a spiral movement, for example, within the separation chamber; that is, that there are further movement components in addition to the axial component of the movement.

An additional aspect of the invention relates to a rotor for a separation device for which independent protection is sought. The rotor, in particular a rotor for a centrifugal dryer, is configured to implement a transport movement of a solid, such as a granulate, essentially along the longitudinal axis of the rotor by means of the latter's rotary motion. The rotor according to the invention is characterized in that the rotor has multiple separable rotor segments in the direction of the longitudinal axis. By dividing the rotor into at least two, preferably three or more rotor segments, the rotor is easier to handle during possible maintenance and/or repair work to be carried out on it. The rotor according to the invention can be dismantled into multiple rotor sections, which can also be removed or exchanged via a side area of the housing, such as a door.

In an additional aspect, the invention also relates to a method for maintaining a separation device according to one of the preferred embodiments described above.

The method according to the invention achieves the object described at the beginning with the following steps: opening a part of the housing and dismantling at least one surface element that forms at least one area of a separation chamber surrounding the rotor; releasing at least one bearing of the rotor, preferably the upper or lower bearing of the rotor; releasing at least one connection between two adjacent rotor segments, and removing a rotor segment, in particular a rotor segment arranged below the upper rotor segment via a preferably lateral opening of the housing, and preferably removing an additional rotor segment, in particular the upper or lower rotor segment, from the housing of the separation device.

With the assistance of the method steps according to the invention, it is possible, instead of an otherwise normally one-piece rotor that is to be lifted out via the upper end of a separation device, to separate the rotor into multiple rotor segments and then, starting with one rotor segment of the rotor, to remove the rotor segments of the rotor one after the other from the interior of the housing of a separation device and, if necessary, to replace them with corresponding spare or exchange parts or to mount them accordingly. The removal and insertion of rotor segments of the rotor preferably take place via the openable and closeable lateral housing door of the housing. In order to, in particular, release the connection between the individual rotor segments of the rotor and the connection between the pivot bearing and the bracket in the housing, a surface element surrounding the rotor, specifically the sieve which is arranged at a distance therefrom around the circumferential surface of the rotor and by which the rotor is encased at least in certain sections in its longitudinal direction is to be removed in advance in one embodiment of the invention.

In accordance with a preferred embodiment, the method according to the invention comprises one, several or all of the following steps: mounting by assembling and aligning multiple rotor segments that can be mounted side by side in the longitudinal direction of the rotor by centering the rotor segments relatively to each other by centering means and/or by bringing into operative connection form closure element corresponding to each other at adjacent rotor segments; releasing and/or connecting a connecting coupling between a separate shaft section accommodated on the housing by means of a lower pivot bearing for the rotor and a shaft section of the lower rotor segment of the rotor.

The preferred embodiments or developments described for the separation device according to the invention are also preferred embodiments of the rotor according to the invention and of the method according to the invention for maintaining a separation device. The preferred embodiments and developments of the rotor and of the method for maintaining the separation device described herein, which relate to the separation device, are at the same time preferred embodiments of the separation device.

BRIEF DESCRIPTION OF THE DRAWINGS

The invention is described in more detail below using a preferred exemplary embodiment with reference to the attached figures. The following is shown.

DETAILED DESCRIPTION

Figure 1:
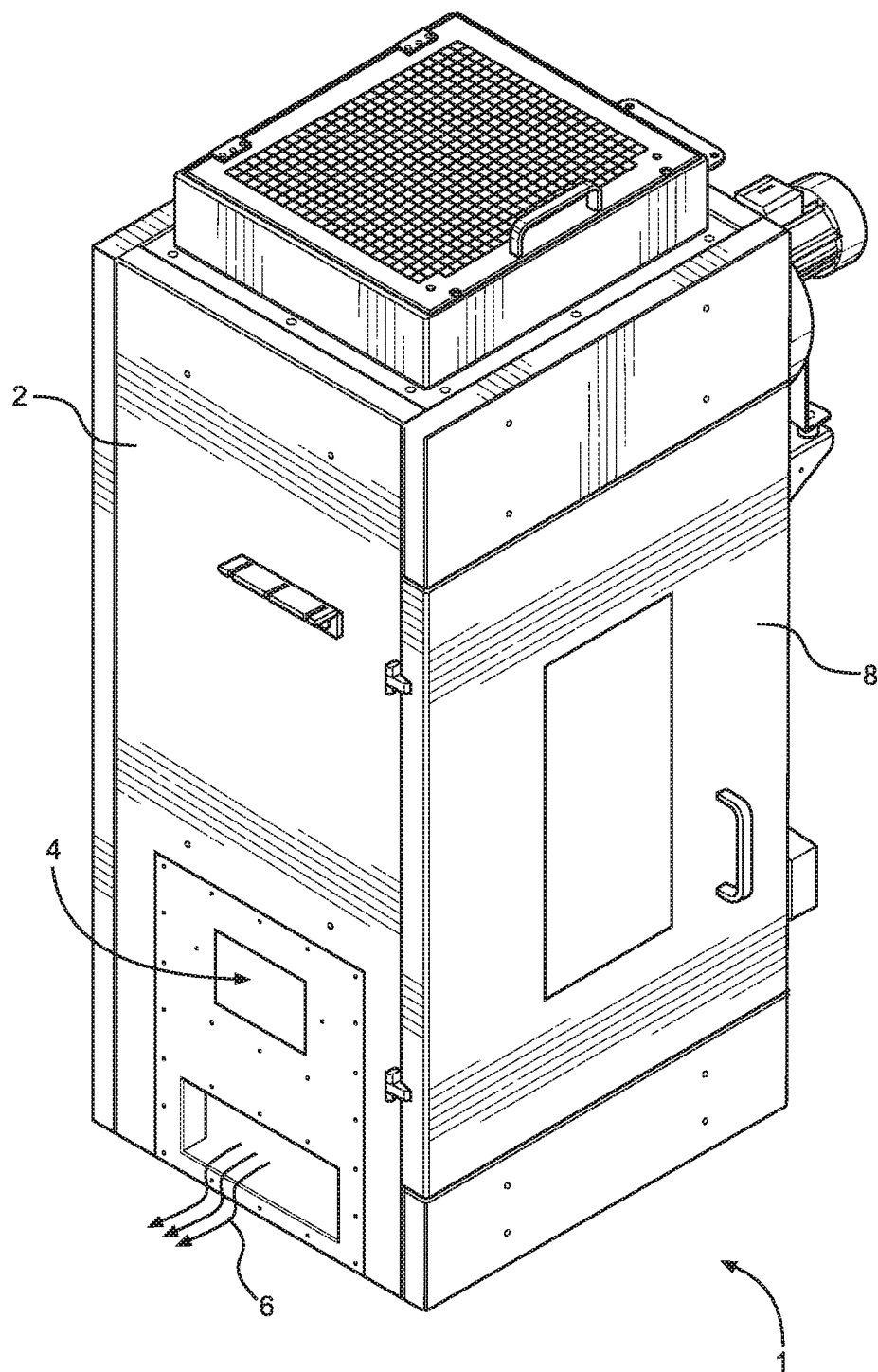
FIG. 1: a perspective view of a separation device according to the invention.

FIG. 1 shows a separation device 1 designed as a centrifugal dryer for separating a solid material from a conveying stream. The separation device 1 comprises a housing 2 with a housing inlet 4 for supplying a mixture of water and granulate and at least one housing outlet 6 for discharging the water from the housing and one housing outlet 6' (FIG. 3) for discharging the solid. The housing 2 has a housing door 8 hinged in a manner pivotable at the housing for access to the interior of the separation device 1.

Figure 2:
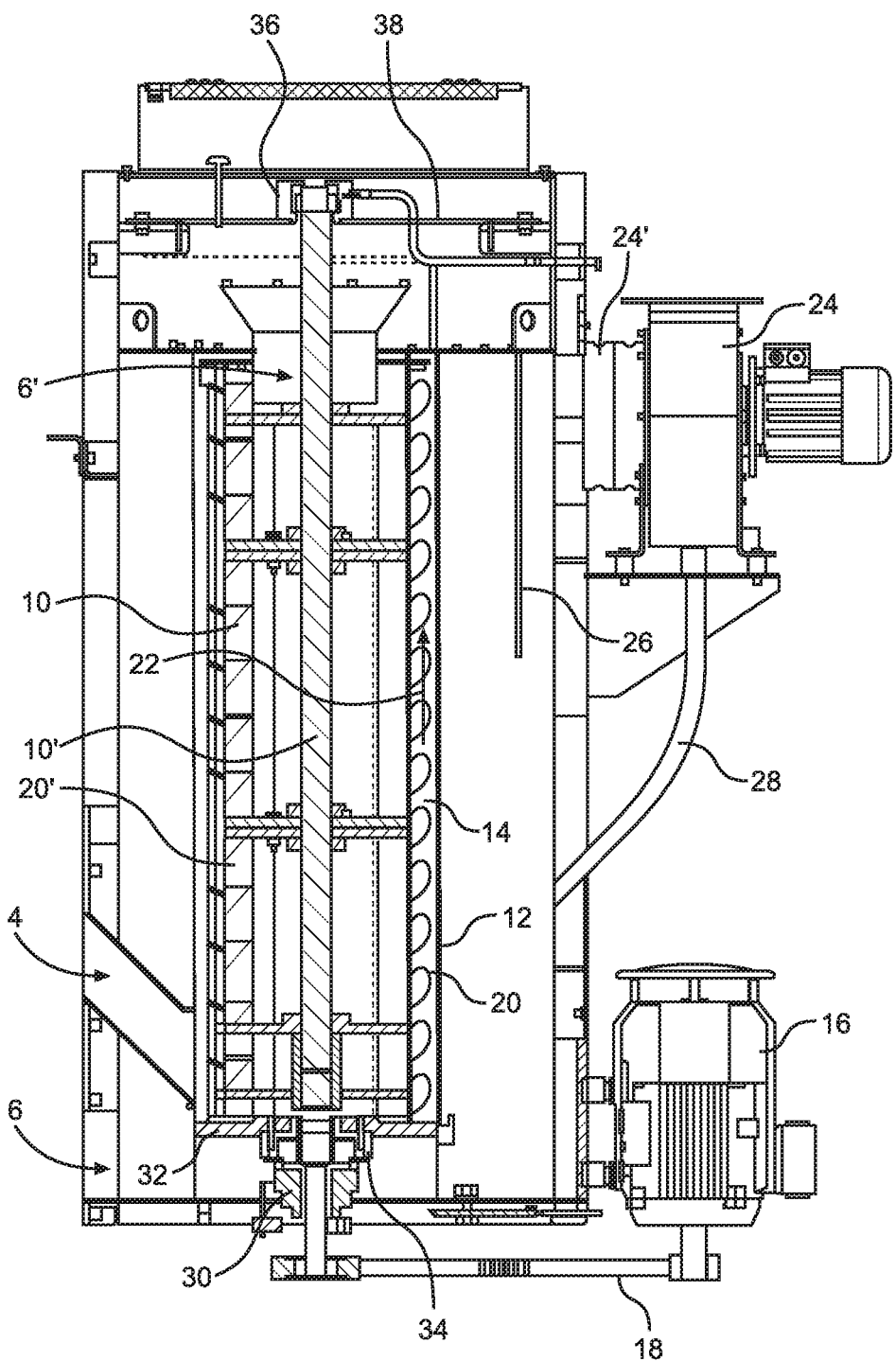
FIG. 2: a front view of the separation device in section.
Figure 3:
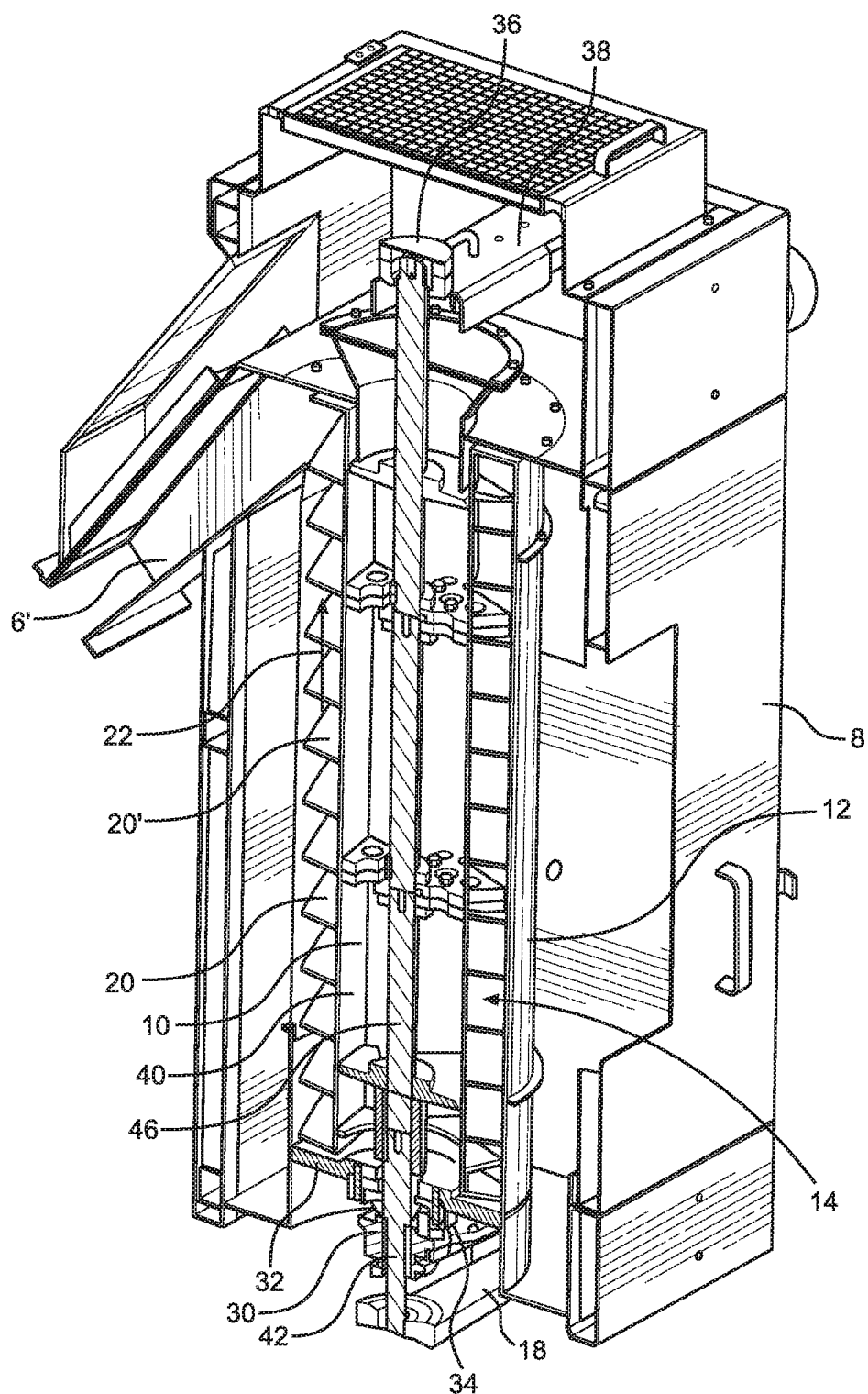
FIG. 3: a perspective view of the separation device according to the invention in section.

As FIGS. 2 and 3 show, a rotor 10 is arranged within the housing 2. The rotor 10 has an essentially vertical longitudinal axis of 10', around which the rotor can be rotated during operation. The rotor 10 is also configured to, by means of rotation around the longitudinal axis 10', implement a transport movement of the solid material in the direction of the longitudinal axis of the rotor from the inlet 4 to the outlet 6' at the upper end of the housing 2 (FIG. 3).

In the circumferential direction and in the longitudinal direction, the rotor 10 is surrounded by a sieve 12 at least in certain areas or at least in certain sections. The sieve 12 defines a separation chamber 14 for the solid material to be separated from the mixture of water and the solid material. The rotor 10 is set in rotation by a drive 16, preferably designed as an electric motor, via the gear unit 18. The rotor has a large number of transport elements 20, 20'. The transport elements 20, 20' are respectively arranged in multiple rows around the longitudinal axis 10' of the rotor 10. The transport elements 20, 20' run at an angle inclined to the longitudinal axis 10' of the rotor. By means of the transport elements 20, 20', an outer conveyor section is formed at the outer circumference of the rotor 10. The inclined transport elements 20, 20' cause the transport movement 22 from inlet 4 toward outlet 6' for the solid material.

In addition, a fan 24 is arranged on housing 2 and connected to the interior of the housing 2 in a fluid-conducting manner via the exhaust air duct 24'. Via the fan 24, water vapor within the housing 2, which is generated when the water evaporates on the surface of the already separated but still hot solid material, is discharged. A baffle plate 26 is arranged within the housing to cover the inlet of the exhaust air duct 24'. In addition, a condensate line 28 is provided on the fan 24 for returning fluid that has been discharged.

As can also be seen in FIGS. 2 and 3, the rotor 10 has a lower axial and/or radial bearing 30, which is arranged on a bearing plate 32, for the rotatable mounting of the rotor. The lower bearing 30 is detachably connected to the bearing plate 32 via multiple screw connections 34. After releasing the screw connections 34, the lower bearing 30 can be removed downward from the bearing plate 32 and the rotor 10 can be set down on the bearing plate 32. In addition, the rotor 10 is connected to the housing 2 by means of an upper pivot bearing 36 on a bracket 38. In accordance with one embodiment, the upper pivot bearing 36 can also be formed as an axial and/or radial bearing.

Figure 4:
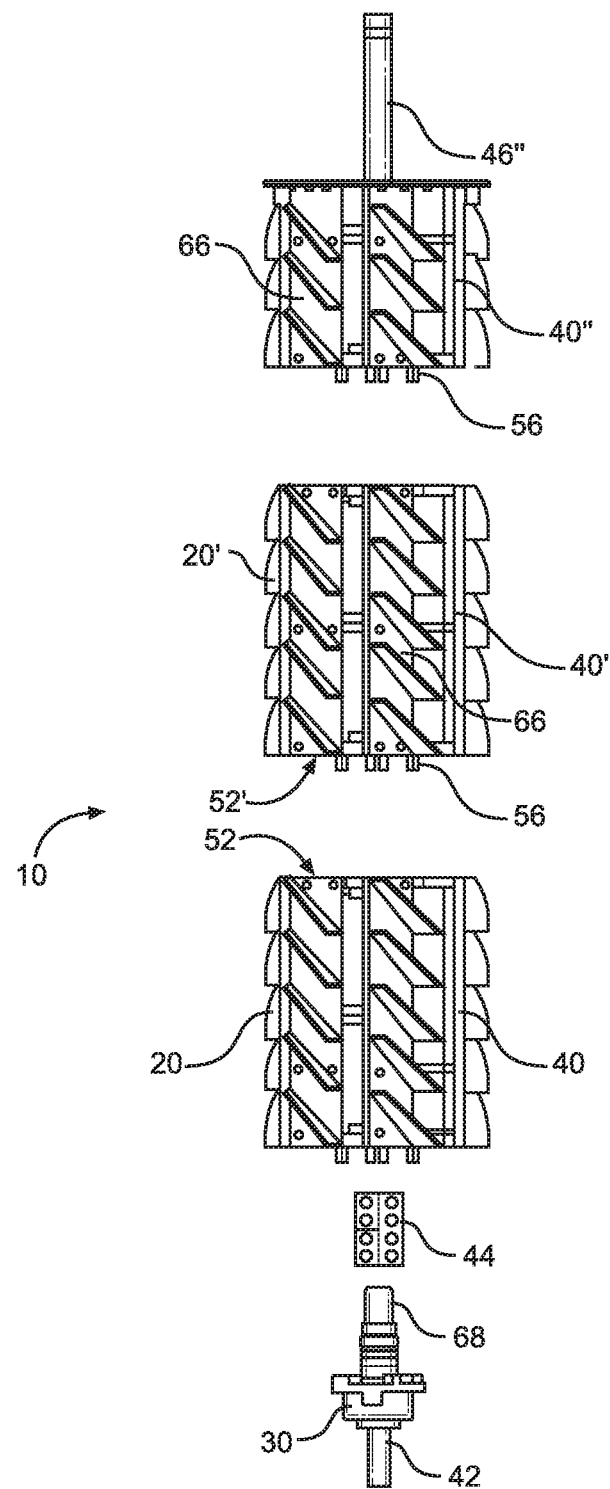
FIG. 4: an exploded view of a rotor according to the invention.

As FIG. 4 shows, rotor 10 is divided in the direction of its longitudinal axis 10' into multiple separable rotor segments 40, 40', 40" or the rotor 10 has several separable rotor segments 40, 40', 40" in the longitudinal direction. The rotor also has a separate shaft section 42. The shaft section 42 is accommodated by means of the lower pivot bearing 30 arranged thereon. The shaft section 42 extends into the lower rotor segment 40 in certain areas. The lower shaft section 42 is coupled in a rotationally fixed manner with a shaft section 46 of the lower rotor segment 40 by means of a shaft coupling 44. The upper rotor segment 40" has a shaft section 46" that projects beyond the upper end of the rotor segment 40".

Figure 5:
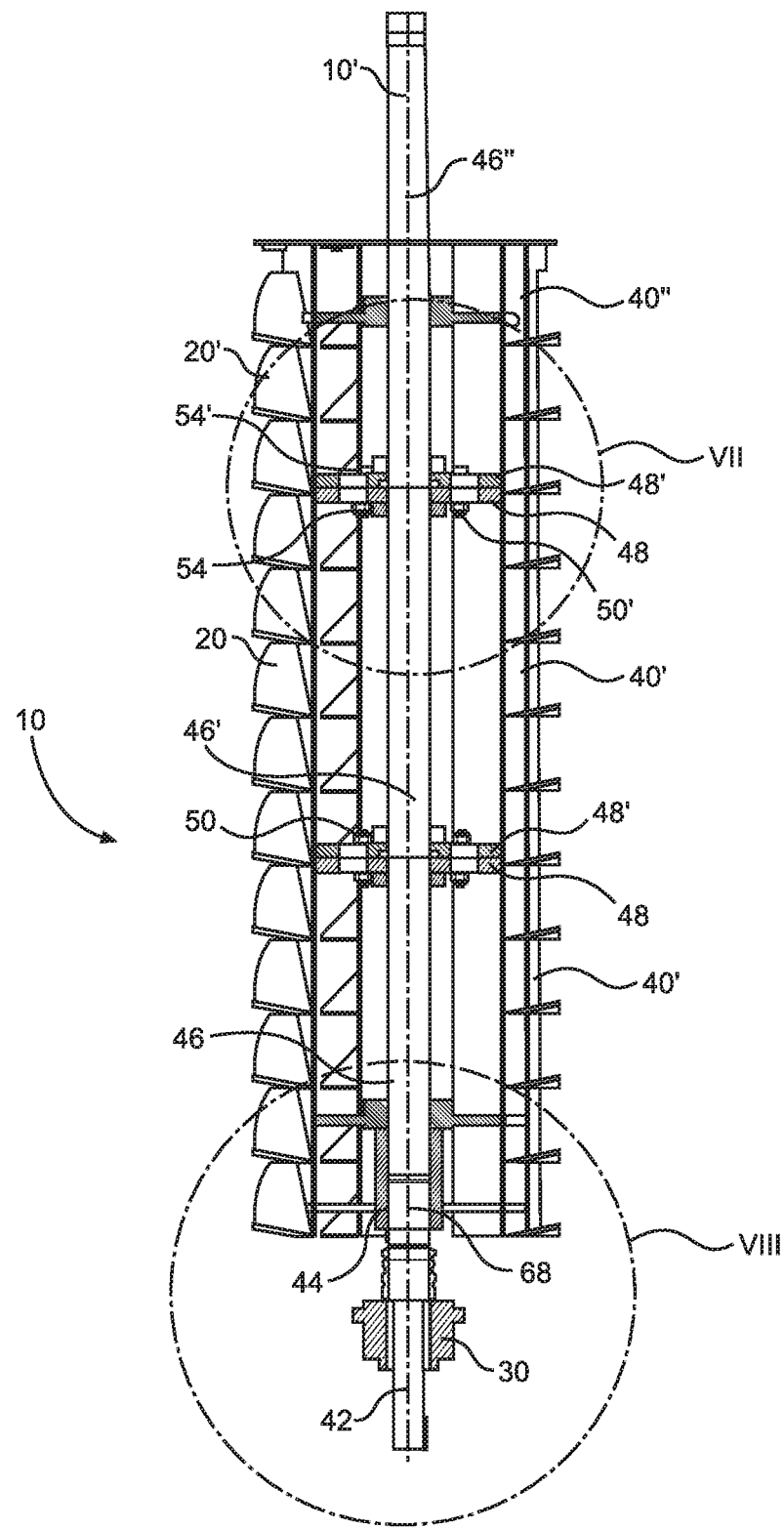
FIG. 5: a view that shows the rotor according to the invention according to FIG. 4 in its assembled state.

FIG. 5 shows the rotor 10 consisting of multiple rotor segments 40, 40', 40" in the assembled state, wherein all rotor segments 40, 40', 40" are connected to each other in a rotationally fixed manner. The individual rotor segments 40, 40', 40" are connected by means of corresponding connecting parts 48, 48', which are detachably connected to each other via screw connections 50, 50'. This ensures that the rotor segments 40, 40', 40" can be separated from each other. Each connecting part 48, 48' has contact surfaces 52, 52' that can be brought into contact with each other. Centering means 54, 54' for the coaxial and/or radial alignment of the rotor segments 40, 40', 40" to each other are provided on the contact surfaces 52, 52'. The centering means 54 are designed as an axial material projection in the contact surface 52 of the connecting part 48 and the centering means 54' are designed as undercut in the contact surface 52' of the connecting part 48'. Furthermore, in one embodiment of the invention, axially projecting force closure elements and/or form closure elements 56, 56' (FIG. 4) are arranged on the contact surface 52' of the rotor segments 40', 40"; these elements engage in the form closure elements, which are not shown in more detail and are formed as recesses, on the contact surface 52 of the rotor segments 40, 40'. As FIG. 5 shows, the shaft coupling 44 is a sleeve part that is connected, preferably in a positive-locking and force-fitting manner, to the shaft section 42 and to the shaft section 46 of the lower rotor segment 40.

Each rotor segment 40, 40', 40" has a central shaft section 46, 46', 46". At least two connecting parts 48, 48' each are arranged at the shaft sections 46, 46', 46" of the rotor segments. The connecting parts are used to connect the rotor segments 40, 40', 40" to each other and to hold the transport elements 20, 20' to the respective shaft sections 46, 46', 46". The connecting parts 48, 48' are arranged at a distance from each other in the direction of the longitudinal axis 10'.

Figure 6:
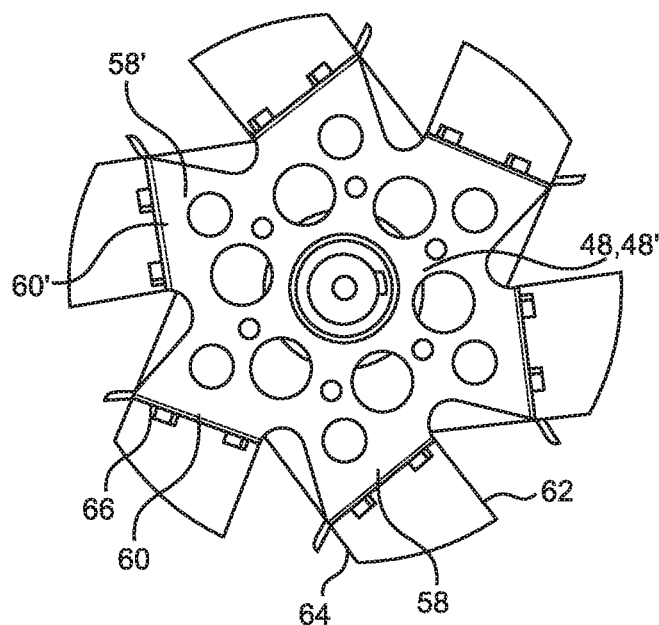
FIG. 6: a top view of a rotor star according to the invention.

As FIG. 6 shows, the connecting parts 48, 48' are plate-shaped. In a preferred embodiment, the connecting parts 48, 48' are designed as rotor stars with star-shaped projections 58, 58' projecting outward. Each projection 58, 58' has a lateral flank 60, 60' on which the transport elements 20, 20' are arranged for implementing the transport movement of the solid material in the longitudinal direction of the rotor 10. The transport elements 20, 20' are designed as lifting elements. The transport elements have a decreasing width in the direction opposite their direction of rotation, in particular in the direction of movement of the solid material. The front edge 62 of each transport element 20, 20' is at least half the width of the rear edge 64 of the transport element.

Figure 7:
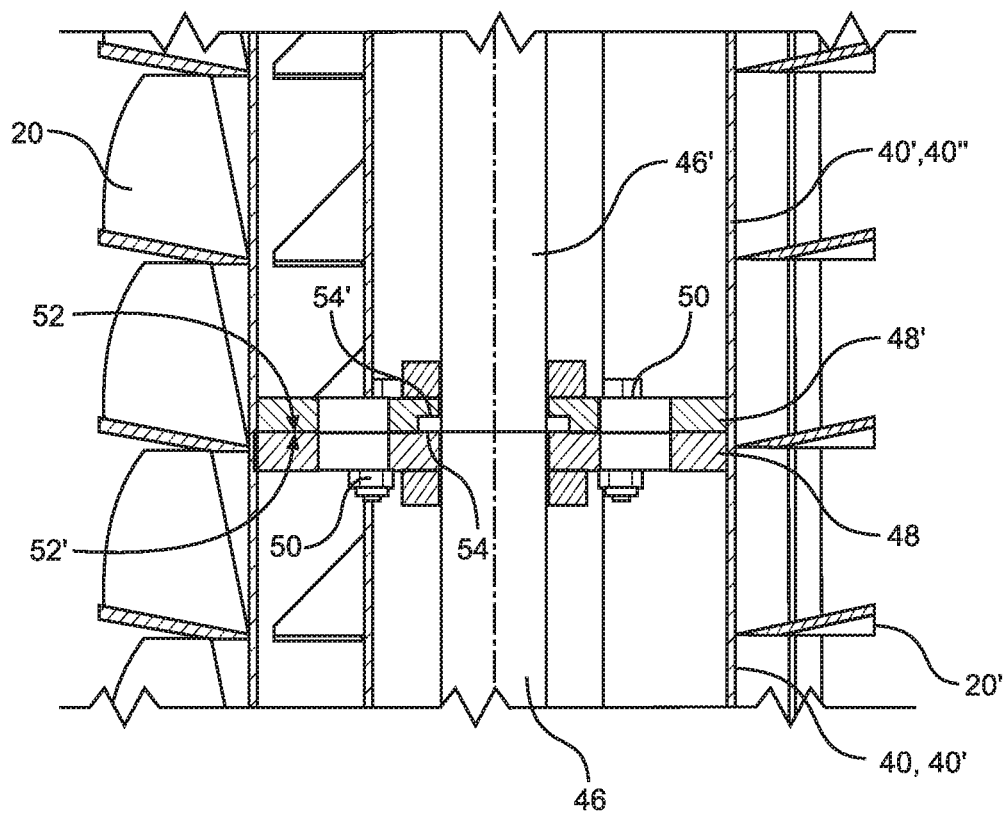
FIG. 7: an enlarged partial view of circle VII from FIG. 5.

FIG. 7 shows an enlarged view of the connection area between two rotor segments 40, 40', 40". The shaft sections 46, 46', 46" flatly abut against each other in the present embodiment. The transport elements 20, 20' are attached to the connecting parts 48, 48' of the respective rotor segments by corresponding connecting plates 66, which run essentially in parallel to the longitudinal axis 10' of the rotor. The connecting parts 48, 48' of the respective rotor segments are detachably connected to each other by means of the screw connections 50, 50'.

Figure 8:
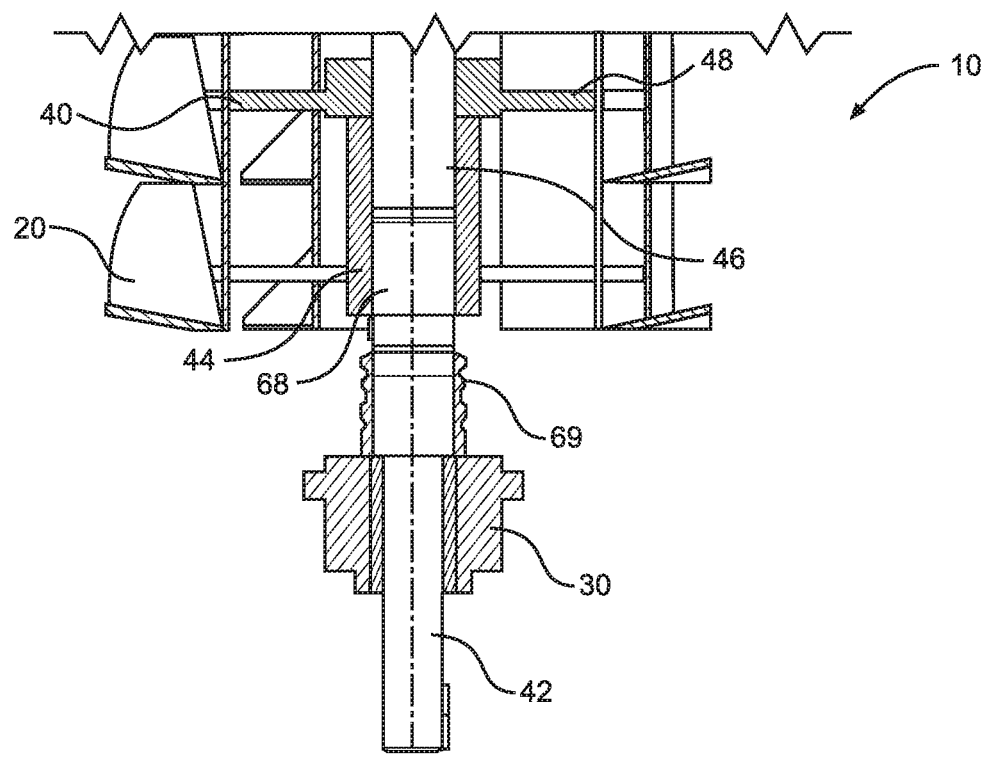
FIG. 8: an enlarged partial view of circle VIII from FIG. 5.

FIG. 8 illustrates the design of the separate shaft section 42, which is accommodated by the lower pivot bearing 30 of the rotor. The upper journal 68 of the shaft section 42 projecting from the bearing plate 32 and the shaft coupling 44 are arranged within the lower rotor segment 40 of the rotor 10. The shaft coupling 44 connects the journal 68 of the shaft section 42 to the lower section of the shaft section 46 of the rotor segment 40 in a rotationally fixed manner. The rotationally fixed connection is achieved by means of corresponding groove and feather key connections. In addition, a sealing element 69 for sealing against the stationary bearing plate 32 (FIG. 2) is provided on the rotatable shaft section 42.

Figure 9:
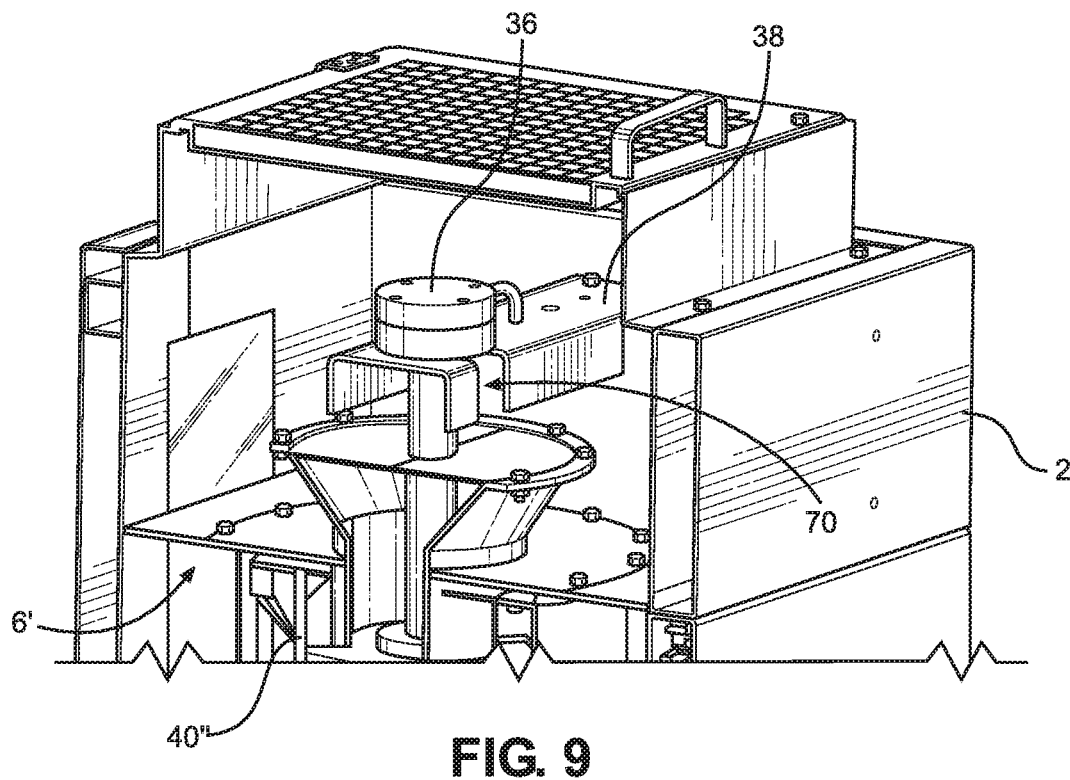
FIG. 9: a perspective partial view of the separation device according to FIG. 3 in section.

FIG. 9 shows the upper end of the housing 2. The upper pivot bearing 36 is attached to the bracket 38 of the housing 2. In order to be able to remove the upper rotor segment 40" from the housing 2, the bracket 38 has a lateral recess 70. The lateral recess 70 allows the shaft section 46 to be removed or inserted with the upper pivot bearing 36 arranged thereon. After the screw connections 50, 50' between the rotor segments 40, 40', 40" and the rotationally fixed connection on the shaft coupling 44 to the separate shaft section 42 have been released and the upper pivot bearing 36 on the bracket 38 has been released, at least one of the rotor segments 40, 40', 40", which can be separated from each other, can be removed from the housing 2 of the separation device 1 via the housing door 8.

Figure 10:
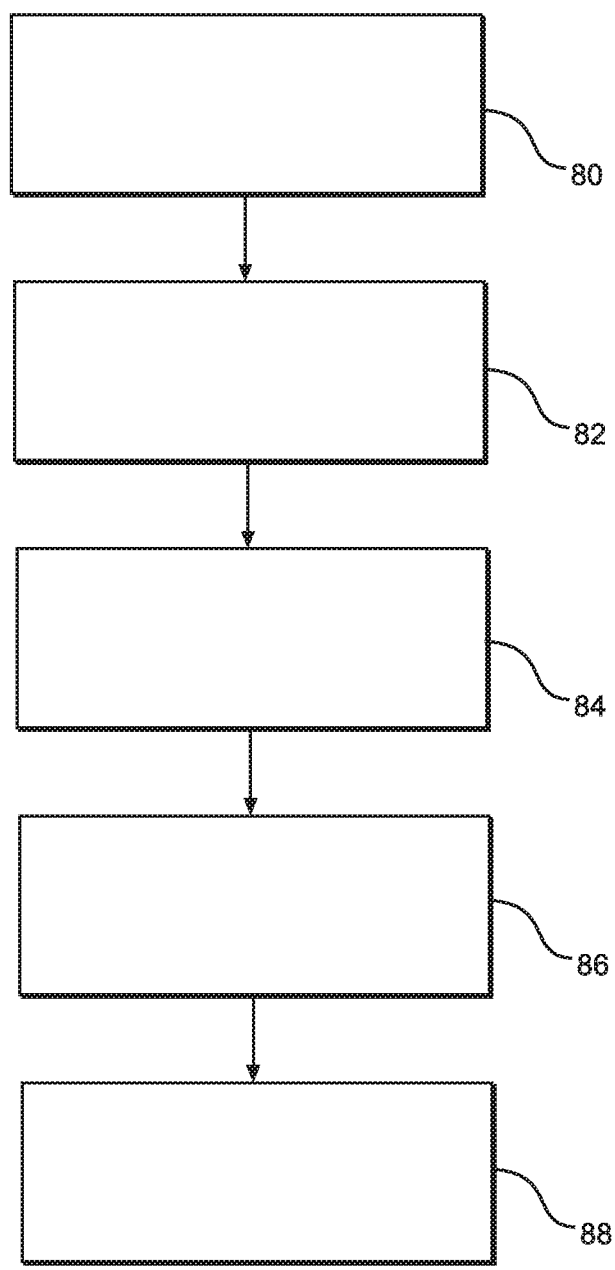
FIG. 10: a block diagram of a method according to the invention for maintaining a separation device.

In the following, the method according to the invention for maintaining a separation device is described in conjunction with the block diagram of FIG. 10. According to one embodiment of the method according to the invention, a part, in particular the housing door 8 of the housing 2, is opened in step 80 and at least one surface element, in particular the sieve 12, which surrounds at least one area of the rotor 10, is dismantled in step 82. In step 84, at least one bearing of the rotor 10, in particular the lower pivot bearing 30 and/or the upper pivot bearing 36 of the rotor 10, is released. Furthermore, in step 86, at least one connection, in particular the screw connections 50, 50' between two corresponding connecting parts 48, 48' of two rotor segments 40, 40', is released. Moreover, in step 88, at least one rotor segment 40, 40', 40", in particular a central rotor segment 40', is removed through a lateral opening of the housing 2, in particular through the pivotable housing door 8 of the housing 2.

LIST OF REFERENCE SIGNS

1 Separation device
2 Housing
4 Inlet
6, 6' Outlet
8 Housing door

10 Rotor
10' Longitudinal axis
12 Sieve
14 Separation chamber
16 Drive
18 Gear unit
20, 20' Transport element
22 Transport movement
24 Fan
24' Exhaust air duct
26 Baffle plate
28 Condensate line
30 Lower pivot bearing
32 Bearing plate
34 Screw connection
36 Upper pivot bearing
38 Bracket
40, 40', 40" Rotor segment
42 Shaft section
44 Shaft coupling
46, 46', 46" Shaft section
48, 48' Connecting part
50, 50' Screw connection
52, 52' Contact surface
54, 54' Centering means
56, 56' Form closure element
58, 58' Projection
60, 60' Flank
62 Front edge
64 Rear edge
66 Connecting plate
68 Journal
69 Sealing element
70 Lateral recess
80, 82, 84 Method step
86, 88 Method step

What is claimed is:

1. A separation device for separating a mixture of a solid material and a fluid, the separation device comprising:
a housing that has at least one housing inlet for supplying the mixture of the solid material and the fluid and at least one housing outlet for discharging the solid material or the fluid separated from the mixture, and
a rotor arranged within the housing and mounted rotatably around a longitudinal axis, the rotor being configured to cause movement of the solid material in the direction of the longitudinal axis by rotating,
wherein the rotor comprises multiple rotor segments that are arranged in series with one another along the longitudinal axis, wherein the rotor segments are separable from one another,
wherein each rotor segment has multiple transport elements, wherein the respective transport elements of adjacent rotor segments are in series along the longitudinal axis, and
wherein each of the multiple rotor segments is configured to cause movement of the solid material in the direction of the longitudinal axis.

2. The separation device of claim 1, wherein the rotor further comprises a lower axial and/or radial bearing for rotatable mounting.

3. The separation device of claim 2, wherein the rotor further comprises a separate shaft section fixed in the housing via the lower axial and/or radial bearing.

4. The separation device of claim 3, wherein a rotor segment is coupled to the separate shaft section for coupling with a drive for rotating the rotor.

5. The separation device of claim 1, wherein at least one rotor segment has a central shaft section on which at least two rotor stars are arranged for holding the multiple transport elements for transporting the solid material in the direction of the longitudinal axis of the rotor.

6. The separation device of claim 5, wherein each rotor segment comprises two connecting parts arranged at a distance from each other in the direction of the longitudinal axis.

7. The separation device of claim 6, wherein one connecting part is plate-shaped and/or is one of the at least two rotor stars with projections projecting outward.

8. The separation device of claim 7, wherein the rotor segments with their transport elements are at least partially arranged within a sieve surrounding the rotor.

9. The separation device of claim 8, wherein the rotor is enclosed in a separation chamber that surrounds the rotor circumferentially and that is defined at least by the sieve.

10. The separation device of claim 5, wherein the rotor is mounted via an upper pivot bearing on a bracket at an upper area of the housing.

11. The separation device of claim 10, wherein the bracket defines a recess for laterally removing the shaft section of an upper rotor segment.

12. The separation device of claim 1, wherein the multiple transport elements comprise lamella-like transport elements arranged in multiple rows around the longitudinal axis or are aligned at an angle inclined to the longitudinal axis of the rotor.

13. The separation device of claim 1, wherein the housing has at least one lateral opening and a flap for closing the lateral opening, such that at least one rotor segment is introduced or removed into the housing through the lateral opening.

14. A method for maintaining the separation device of claim 1, the method comprising:
opening a part of the housing and dismantling at least one surface element that forms at least one area of a separation chamber surrounding the rotor;
releasing at least one bearing of the rotor;
releasing at least one connection between two adjacent rotor segments; and
removing a rotor segment through the housing.

15. A separation device for separating a mixture of a solid material and a fluid, the separation device comprising:
a housing that has at least one housing inlet for supplying the mixture of the solid material and the fluid and at least one housing outlet for discharging the solid material or the fluid separated from the mixture, and
a rotor arranged within the housing and mounted rotatably around a longitudinal axis, the rotor being configured to cause movement of the solid material in the direction of the longitudinal axis by rotating,
wherein the rotor comprises multiple rotor segments along the longitudinal axis, and wherein two adjacent rotor segments are reversibly and detachably connected to each other via corresponding connecting parts.

16. The separation device of claim 15, wherein the connecting parts of the rotor segments have contact surfaces which can be brought into contact with each other.

17. The separation device of claim 16, further comprising a centering device that is configured to coaxially and/or radially align the rotor segments relative to each other.

18. The separation device of claim 15, wherein the connecting parts comprise mutually corresponding force closure elements and/or form closure elements for a given angular alignment of the rotor segments around their longitudinal axis.

19. A separation device for separating a mixture of a solid material and a fluid, the separation device comprising:
- a housing that has at least one housing inlet for supplying the mixture of the solid material and the fluid and at least one housing outlet for discharging the solid material or the fluid separated from the mixture, and
- a rotor arranged within the housing and mounted rotatably around a longitudinal axis, the rotor being configured to cause movement of the solid material in the direction of the longitudinal axis by rotating,
- wherein the rotor comprises multiple rotor segments that are arranged in series with one another along the longitudinal axis, wherein the rotor segments are separable from one another,
- wherein each of the multiple rotor segments is configured to cause movement of the solid material in the direction of the longitudinal axis, and
- wherein at least two adjacent rotor segments are reversibly and detachably connected to each other.

20. The separation device of claim 19, wherein the at least two adjacent rotor segments are reversibly and detachably connected to each other via corresponding connecting parts that have contact surfaces which can be brought into contact with each other.

* * * * *